United States Patent [19]
Chapin

[11] 3,800,600
[45] Apr. 2, 1974

[54] METHOD AND APPARATUS FOR MANUFACTURING VEHICLE WHEELS

[75] Inventor: Gordon C. Chapin, Plymouth, Mich.

[73] Assignee: Kelsey-Hayes Company, Romulus, Mich.

[22] Filed: Sept. 14, 1972

[21] Appl. No.: 288,935

[52] U.S. Cl................ 73/141 R, 29/159.01, 29/525
[51] Int. Cl............................................... G01l 5/00
[58] Field of Search.................... 73/141 R, 9, 10; 29/159.01, 525, 238, 251

[56] References Cited
UNITED STATES PATENTS
3,601,450   8/1971   Baker........................... 29/159.01 X
3,608,370   9/1971   Vollenweider.................... 73/141 R OTHER PUBLICATIONS
Alpha–Molykote, Dow Corning Corporation, Bulletin 146, March, 1965.

Primary Examiner—Donald O. Woodiel
Assistant Examiner—Anthony V. Ciarlante
Attorney, Agent, or Firm—Harness, Dickey & Pierce

[57] ABSTRACT

A method and apparatus for determining the degree of interference fit between a wheel rim member and an associated spider member, and including means for applying a force against one member of a partially assembled wheel consisting of the wheel rim member and wheel spider member, means for resisting movement of one of the members in response to the application of the force, and means for sensing the proportion of the force applied to the one member that is transmitted to the other member, whereby to inform the operator as to the degree of fit between the outer periphery of the spider and the inner periphery of the wheel rim.

19 Claims, 2 Drawing Figures

PATENTED APR 2 1974　　　　　　　　　　　　　3,800,600

3,800,600

METHOD AND APPARATUS FOR MANUFACTURING VEHICLE WHEELS

BACKGROUND OF THE INVENTION

The present invention is generally directed toward a method and apparatus for maintaining higher quality control in connection with the manufacture of automobile and similar type vehicular wheels. More particularly, in order to assure satisfactory vehicular wheel performance, it is necessary that the majority of the load carried by the interface between the wheel rim and wheel spider is borne by the interengageable portions therebetween, as opposed to the particular locations at which the wheel spider is welded to the wheel rim. In other words, due to the particular geometry between the wheel rim and spider, in order to avoid premature wheel failure, it is imperative that the weld locations serve merely to secure the spider and wheel rim together and do not function in a load-carrying capacity. Toward this end, it has been found that the load carried by the wheel weld areas can be minimized to the extreme if a predetermined press or interference fit exists between the outer periphery of the wheel spider and the inner periphery of the wheel rim upon assembly thereof and preparatory to these two components being secured to one another by a subsequent welding operation. Accordingly, if a predetermined press fit exists between the rim and spider, it is assured that any wheel load transmitted between the wheel rim and wheel spider occurs via the interface between these members as opposed to the weld locations.

The present invention is, accordingly, directed toward a method and apparatus for determining the aforesaid interference fit between the wheel rim and wheel spider during assembly thereof and preparatory to these components being fixedly secured to one another by means of a subsequent welding operation. Briefly, the desired interference fit is determined by applying a force to one component of a preassembled wheel rim and wheel spider and determining to what degree that force is transmitted to the other of the components. By determining what portion of the force is transmitted to the "other" component, the operator can ascertain whether or not the desired fit exists between the spider and rim members. If the proper fit does exist, the assembled components are thereafter transferred to a suitable apparatus which performs a welding operation thereon to fixedly secure the wheel spider within the wheel rim; conversely, if the desired fit is not found to exist by means of the apparatus of the present invention, the preassembled rim and spider members are removed from the production line to either be rematched with compatible rim and/or spider members or otherwise disposed of, as will hereinafter be described in detail.

SUMMARY OF THE INVENTION

Generally speaking, the present invention is directed toward an apparatus and method for determining the degree of interference fit between the outer periphery of a wheel spider and the inner periphery of an associated wheel rim member. More particularly, the present invention is directed toward a method and apparatus, as above-described, which determines the aforesaid interference fit relationship between the rim and spider members by applying and sensing predetermined loads or forces thereto.

It is accordingly a general object of the present invention to provide a new and improved method and apparatus for manufacturing vehicular wheels.

It is a more particular object of the present invention to provide a new and improved method and apparatus for determining the degree of interference fit between vehicle wheel rims and associated spider members whereby to assure that loading applied to the completed vehicle wheel is not carried or transmitted to any appreciable degree by the weld locations fixedly securing the wheel rim to the wheel spider.

It is another object of the present invention to provide a new and improved apparatus, as hereinabove described, which is of a relatively simple design and which may be compatibly located in a standard assembly line for manufacturing vehicle wheels.

Other objects and advantages of the present invention will be apparent from the following detailed description taken in conjunction with the accompanying drawing.

DESCRIPTION OF THE PREFERRED EMBODIMENT

Figure 1:
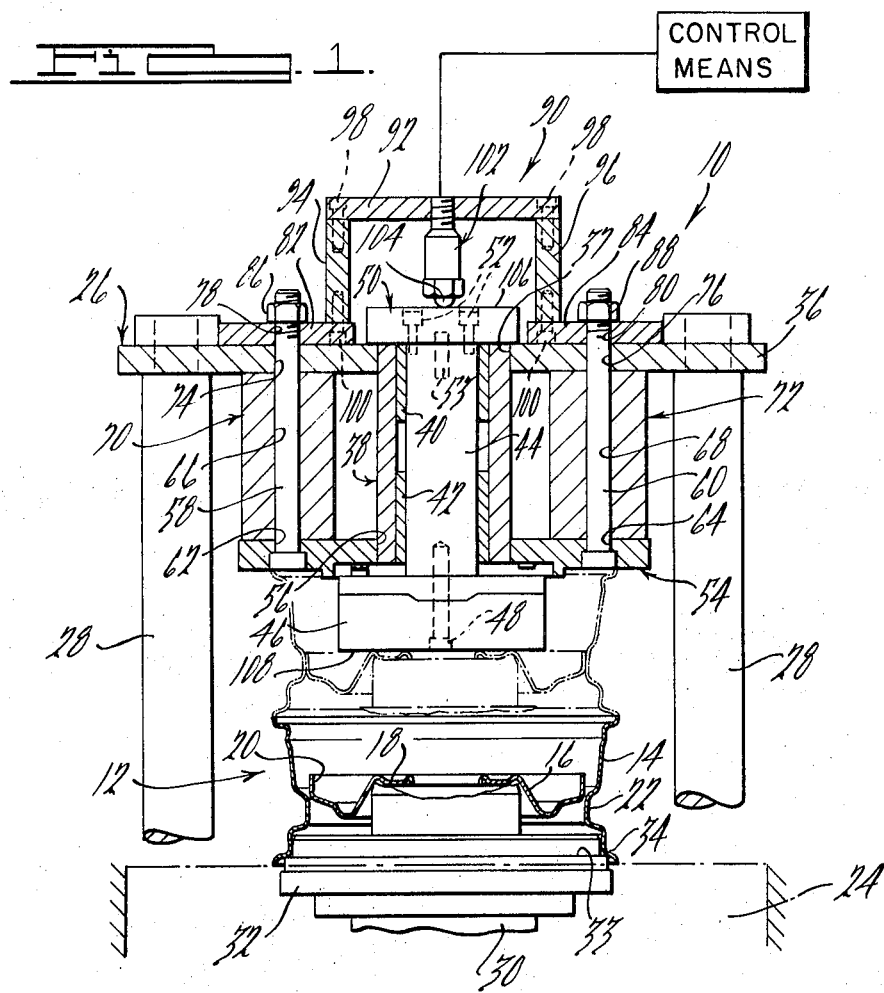
FIG. 1 is a transverse cross-sectional view of the apparatus of the present invention.

Referring now to FIG. 1 of the drawing, an apparatus for determining the interference fit between the confronting surfaces of a wheel rim and spider is generally designated by the numeral 10 and is shown in operative association with a typical vehicle wheel 12 including annular wheel rim 14 and associated wheel spider 16. As is well known in the art, the wheel spider comprises a generally radially disposed attachment portion 18 designed to be secured to an associated vehicle axle, and an annular axially disposed flange portion 20 that extends at least partially around the outer periphery of the portion 18 and is adapted to be secured as by welding to a radially disposed intermediate section 22 of the wheel rim 14. In accordance with the principles of the present invention, the apparatus 10 is intended to be located directly "upstream" in the wheel assembly line from the welding machine which functions to fixedly secure the flange portion 20 to the rim portion 22. In this position, the apparatus 10 is generally intended to function in determining the degree of interference fit between the outer periphery of the flange portion 20 and the inner periphery of the rim portion 22 in order to positively assure that a predetermining dimensional relationship exists before the assembled rim and spider are transferred to the welding machine where they are finally secured to one another, as will hereinafter be described in detail.

Figure 2:
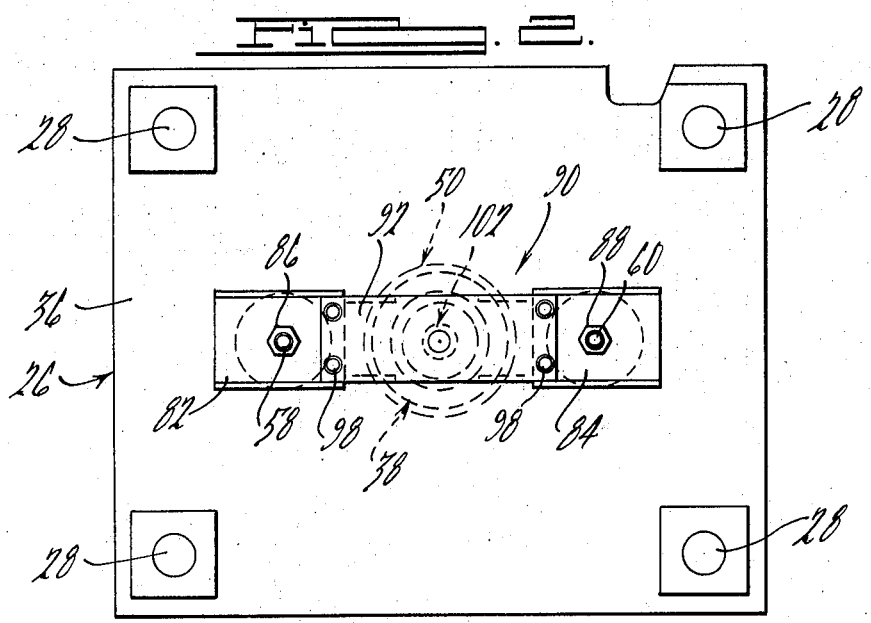
FIG. 2 is a plan view of the apparatus shown in FIG. 1.

Referring now in detail to the construction of the apparatus 10, said apparatus includes a lower base structure 24 and an upper frame structure 26, the latter of which is supported upon four spaced, generally vertical support columns 28 that are arranged in a generally rectangular orientation, as best seen in FIG. 2. Disposed within the lower base structure 24 is a wheel elevating means representatively designated by the numeral 30 and preferably including a hydraulic or pneumatically energized piston and cylinder assembly that is adapted to effect selective raising and lowering of an annular wheel engaging member 32. The member 32 is of a cross-sectional size such that the wheel rim 14 may be supported thereon by having an annular shoulder 33 of the member 32 engage a generally radially disposed portion 34 of the rim 14. The apparatus 10 is provided with suitable controls which may, if desired, be appropriately interconnected with the control system of the associated production line and which effect selective energization of the elevating means 30, whereupon a partially assembled wheel rim and spider previously mounted thereon, as shown in FIG. 1, are elevated upwardly toward the upper frame structure 26 for purposes hereafter to be described.

With reference now to the upper structure 26, as best seen in FIG. 2, the structure 22 comprises a generally rectangular shaped plate 36 that is supported at each corner thereof by one of the aforementioned support columns 28. The plate 36 is formed with a central annular opening 37 within which the upper end of a generally vertically disposed cylindrical collar member 38 is operatively mounted, the collar 38 depending downwardly from the underside of the plate 36 and being provided with a pair of axially spaced anti-friction bearings or bushings 40 and 42 within the interior thereof. The bushings 40, 42 are adapted to slidingly or reciprocally support the generally cylindrical piston member 44, the lower end of which extends downwardly from the collar 38 and is adapted to carry a lower bearing plate 46 that is secured to the lower end of the piston 44 by means of suitable screws, bolts or similar fastening means representatively designated by the numeral 48. In a similar manner, the upper end of the piston 44 is adapted to have a second or upper bearing plate 50 fixedly secured thereupon by means of suitable screws, bolts or the like 52 and a positioning dowel 53. The lower end of the collar 38 is adapted to be operatively supported by means of a generally horizontally disposed support plate 54 that is formed with an annular opening 56 within which the lower end of the collar 38 is disposed. The support plate 54 is supported or secured to the underside of the plate 36 by means of a plurality of support bolts 58, 60 which extend upwardly through suitable bores 62, 64, respectively, in the plate 54 and then upwardly through bores 66, 68 in a pair of vertically disposed spacer members 70, 72, respectively. The upper ends of the bolts 58, 60 extend upwardly through suitable aligned openings 74, 76 in the plate 36 and thereafter through aligned bores 78, 80 in a pair of mounting plates 82, 84, respectively, located on the upper side of the plate 36. Suitable fastening means, such as nuts 86, 88, are provided on the upper ends of the bolts 58, 60 for securing the same in the operative position shown in FIG. 1.

Disposed directly above the piston 44 and upper bearing plate 50 carried thereon is a superstructure, generally designated by the numeral 90. The superstructure 90 comprises a genrally horizontally disposed top member 92 that extends laterally above the bearing plate 50 and is secured at the laterally outer ends thereof to a pair of vertically disposed side members 94, 96 by suitable screws, bolts or the like 98. The lower ends of the side members 94, 96 are in turn secured by means of suitable screws, bolts or the like 100 to the mounting plates 82, 84 as illustrated, whereby to secure the superstructure to the plate 36. Extending downwardly from and secured to the top member 92 of the superstructure 90 is a force transducer mechanism, generally designated by the numeral 102, having an actuating element 104 on the lower side thereof adapted for engagement with the upper surface 106 of the upper bearing plate 50. The force transducer mechanism 102 may be of any construction well known in the art and is preferably of the adjustable type adapted to produce an electrical control signal in response to or in the absence of a force of a predetermined magnitude being exerted against the actuating element 104. By having the mechanism 102 adjustable, the aforesaid control signal will be produced at some predetermined force application, typically, in the present instance, somewhere in the order of between 500 and 4,000 pounds. The mechanism 102 is connected via suitable circuitry (not shown) to a suitable warning device, either visual or audible, as well as to the cotrol system of the associated production line whereupon production of the control signal effects the opening of the cotrol circuit of the production line to cause the entire line to be temporarily shut down until such time as the signal is terminated, as will be described in connection with the overall operation of the apparatus 10 of the present invention.

In operation, the operator initially inserts a wheel rim, such as a rim 14, onto the wheel engaging member 32. Thereafter, a typical wheel spider, such as a spider 16, is placed within the wheel rim with the flange portion 20 resting upon the uppermost part of the radial portion 22 of the rim. After the rim and spider have been thus preassembled, the operator either manually or through some automatic sequencing control means effects energization of the elevating means 30. When this occurs, the wheel engaging member 32 will move vertically upwardly, thereby causing concomitant upward movement of the partially assembled wheel mounted thereon. Such upward movement of the member 32 causes the wheel to move from the solid line position in FIG. 1 to the phantom line in this figure, whereupon the lower surface, herein designated by the numeral 108, of the lower bearing plate 46 will be engaged by the central portion 18 of the rim 14. Continued upward movement of the wheel will cause the piston 44 to move upwardly under the influence of the spider 16 bearing against the surface 108. This, of course, results in the upper bearing plate 50 applying an upwardly directed force against the actuating element 104 of the mechanism 102. In addition, due to the upwardly directed force being exerted against the wheel rim by the member 32 and the lower bearing plate 46 being engaged with the wheel spider 16, the wheel rim 14 will be displaced upwardly relative to the spider 16 to a position wherein the rim portion 22 is in predetermined axial alignment with the flange portion 20 of the spider 16, this being the final orientation of the components relative to one another preparatory to the same being fixedly secured by means of a subsequent welding operation.

It will be seen that if there is a sufficient interference fit between the wheel spider 16 and wheel rim 14, the upwardly directed force exerted upon the wheel rim 14 by means of the elevating means 30 will be transmitted directly through the wheel, lower bearing plate 46, piston 44 and upper bearing plate 50 to the transducer mechanism 102 which is intended to normally not produce a control signal when a predetermined force is applied thereto during each testing cycle of the apparatus 10. However, in the event the aforesaid predetermined interference fit between the spider 16 and rim 14 does not exist, for example, due to excessive manufacturing tolerance variations, etc., a proportionately lesser amount of the force exerted on the wheel rim 14 will be transmitted via the interface between the portions 20 and 22 to the transducer mechanism 102, whereupon the aforesaid control signal will be produced. When this occurs, some type of warning signal is provided for the operator, and in addition, preferably, the entire production line is temporarily shut down until a new wheel rim and/or spider having the specified interference relationship therebetween has been tested. It will be noted that the production line shut-down and warning occur when the elevating means 30 is in its elevated condition or mode so that the operator will be unmistakably apprised of the improper interference relationship between the rim and spider and therefore will not inadvertently cause these components to be transferred to the adjacent welding machine for final assembly. It will be appreciated, of course, that various other warning arrangements could be utilized so that the operator is informed as to the improper interference relationship between the wheel rim and wheel spider being tested; however, it has been found that the best warning system possible is to have the entire assembly line shut down until such time as a wheel rim and spider having the desired intereference fit has been tested. Under normal conditions, of course, the large majority of the rims and spiders being tested will have the desired interference fit and under these circumstances, the elevating means 30 may be either automatically or manually deenergized at the end of the testing cycle, whereupon the assembled rim and spider can be transferred to the adjacent welding machine for final assembly and a new rim and spider may be inserted into the apparatus 10 for subsequent testing operation.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. An apparatus for determining the degree of interference fit between an inner peripheral portion of an annular vehicle wheel rim member that is engaged with an outer peripheral portion of an associated spider member which has been preassembled into the rim member, said apparatus comprising, means for applying a generally axially directed force against one of the members of the partially assembled wheel, and means for sensing the magnitude of the force applied to the one member that is transmitted to the other member via the interengaging peripheral portions of the members.

2. An apparatus as set forth in claim 1 which includes force transducer means for sensing the magnitude of the force applied to said one member that is transmitted to said other member.

3. An apparatus as set forth in claim 1 wherein said first mentioned means is engageable with said rim member for applying an axially directed force thereagainst.

4. An apparatus as set forth in claim 3 wherein said means for applying said axially directed force is adapted to apply a force in a generally vertically upwardly direction.

5. An apparatus as set forth in claim 4 which includes means engageable with said spider member for sensing the magnitude of the force applied to said rim member that is transmitted to said spider member.

6. An apparatus as set forth in claim 1 which includes elevating means, means on said elevating means engageable with the rim member for effecting elevation of the partially assembled wheel, and means disposed above said elevating means engageable with the spider member for providing a signal in response to the magnitude of the elevating force applied to said rim member that is transmitted to said spider member via said interengaging peripheral portions thereof.

7. An apparatus as set forth in claim 6 wherein said force sensing means includes a force transducer.

8. An apparatus as set forth in claim 7 which includes a vertically reciprocal piston disposed above said elevating means, means supporting said piston for vertical reciprocal movement, upper and lower bearing means on the upper and lower ends of said piston, said upper bearing means being engageable with said force transducer means and said lower bearing means being engageable with said spider member.

9. An apparatus as set forth in claim 9 which includes means for causing preselected axial displacement of said rim member relative to said spider member concurrently with determining the degree of interference fit therebetween.

10. An apparatus as set forth in claim 1 which includes means cooperative with said sensing means for controlling operation of an associated wheel production line.

11. An apparatus as set forth in claim 1 which includes means responsive to said sensing means for producing a signal in the presence of a predetermined interference condition between said rim and spider members.

12. In the method of determining the degree of interference fit between an inner peripheral portion of an annular vehicle wheel rim member that is engaged with an outer peripheral portion of an associated spider member which has been preassembled into the rim member, the steps which include, applying generally axially directed force against one of the members of the partially assembled wheel, and sensing the magnitude of the force applied to the one member that is transmitted to the other member via the interengaging peripheral portions of the members.

13. The method as set forth in claim 12 which includes the step of sensing said magnitude of the force applied to said one member that is transmitted to the other member by transducer means.

14. The method as set forth in claim 12 which includes the step of simultaneously axially displacing said members relative to one another.

15. The method as set forth in claim 12 which includes the step of applying an axially upwardly directed force to said rim member.

16. The method as set forth in claim 15 which includes the step of sensing the upward movement of said spider member and thereby determining the magnitude of the force applied to said rim member that is transmitted to said spider member.

17. The method as set forth in claim 12 which includes the step of displacing said rim member axially of said spider member and simultaneously determining the degree of interference fit therebetween.

18. The method as set forth in claim 12 which includes the step of providing a signal in response to a predetermined interference fit existing between said rim member and said spider member.

19. The method as set forth in claim 11 wherein the force applying means is located in the production line for vehicle wheels, and which includes the step of predeterminately controlling operations of said production line in response to a predetermined interference fit existing between said rim and spider member.

* * * * *

UNITED STATES PATENT OFFICE
CERTIFICATE OF CORRECTION

Patent No. 3,800,600          Dated April 2, 1974

Inventor(s) GORDON C. CHAPIN

It is certified that error appears in the above-identified patent and that said Letters Patent are hereby corrected as shown below:

Col. 4, line 18, "cotrol" should be --control--; Col. 4, line 20, "cotrol" should be --control--; Col. 6, line 26, in Claim 9, the numeral "9" should be --8--; Col. 6, line 46, in Claim 12, after "applying" the --a-- should be inserted--.

Signed and sealed this 10th day of September 1974.

(SEAL)
Attest:

McCOY M. GIBSON, JR.
Attesting Officer

C. MARSHALL DANN
Commissioner of Patents